(12) United States Patent
Prasad et al.

(10) Patent No.: US 10,403,131 B2
(45) Date of Patent: Sep. 3, 2019

(54) METHOD AND APPARATUS FOR IMPLEMENTING A COOPERATIVE MULTIPLE-INPUT-MULTIPLE-OUTPUT OPERATION

(71) Applicant: Nokia Solutions and Networks Oy, Espoo (FI)

(72) Inventors: Athul Prasad, Helsinki (FI); Mikko Uusitalo, Helsinki (FI); Zexian Li, Espoo (FI); Rauno Ruismaki, Helsinki (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/751,412

(22) PCT Filed: Jul. 19, 2016

(86) PCT No.: PCT/FI2016/050531
§ 371 (c)(1),
(2) Date: Feb. 8, 2018

(87) PCT Pub. No.: WO2017/025658
PCT Pub. Date: Feb. 16, 2017

(65) Prior Publication Data
US 2018/0233036 A1    Aug. 16, 2018

Related U.S. Application Data

(60) Provisional application No. 62/204,843, filed on Aug. 13, 2015.

(51) Int. Cl.
*G08G 1/09* (2006.01)
*G08G 1/01* (2006.01)
(Continued)

(52) U.S. Cl.
CPC ......... *G08G 1/0133* (2013.01); *G08G 1/0112* (2013.01); *G08G 1/0116* (2013.01);
(Continued)

(58) Field of Classification Search
CPC .................................. H04B 1/00; H04L 1/00
See application file for complete search history.

(56) References Cited

U.S. PATENT DOCUMENTS

| | | | |
|---|---|---|---|
| 2010/0188301 A1* | 7/2010 | Kishimoto | G08G 1/095 343/721 |
| 2011/0012798 A1* | 1/2011 | Triolo | H01Q 3/24 343/713 |
| 2014/0036825 A1* | 2/2014 | Sawai | H04B 7/0413 370/329 |

OTHER PUBLICATIONS

Biswas, Jayeta et al. Low complexity user pairing and resource allocation of heterogeneous users for uplink virtual MIMO system over LTE-A network. 2014 IEEE Wireless Communications and Networking Conference (WCNC). Istanbul, Turkey. Apr. 6-9, 2014. pp. 1903-1908; (Year: 2014).*

(Continued)

*Primary Examiner* — Shirley Lu
(74) *Attorney, Agent, or Firm* — Squire Patton Boggs (US) LLP

(57) ABSTRACT

A method and apparatus may include determining that a triggering has occurred. The triggering corresponds to a triggering of a formation of a multiple-input and multiple-output arrangement. The multiple-input and multiple-output arrangement comprises a grouping of user antennas and an antenna of the apparatus, and the apparatus is located at an existing infrastructure. The method may also include receiving data traffic information. The data traffic information comprises information that indicates an amount of data traffic that is requested by users of the user antennas. The method may also include forming the multiple-input and multiple-output arrangement based on the received data traffic information.

15 Claims, 7 Drawing Sheets

(51) Int. Cl.
   H04B 7/02    (2018.01)
   H04B 7/04    (2017.01)
   H04B 7/024   (2017.01)
   H04B 7/0413  (2017.01)
   H04B 7/0452  (2017.01)
(52) U.S. Cl.
   CPC .............. *G08G 1/0129* (2013.01); *H04B 7/02* (2013.01); *H04B 7/024* (2013.01); *H04B 7/04* (2013.01); *H04B 7/0413* (2013.01); *H04B 7/0452* (2013.01)

(56) References Cited

OTHER PUBLICATIONS

Samardzija, Dragan et al. Coherent joint-processing CoMP in pico-cellular lamp-post street deployment. 2011 IEEE 12th Workshop on Signal Processing Advances in Wireless Communications (SPAWC 2011). San Francisco, USA. Jun. 26-29, 2011. pp. 496-500; (Year: 2011).*

Baghban Karimi, Ouldooz et al. Lightweight user grouping with flexible degrees of freedom in virtual MIMO. IEEE Journal on Selected Areas in Communications. vol. 31. No. 10. Oct. 2013. pp. 2004-2012. (Year: 2013).*

International Search Report and Written Opinion received for corresponding Patent Cooperation Treaty Application No. PCT/FI2016/050531, dated Nov. 7, 2016, 14 pages.

Biswas, Jayeta et al. Low complexity user pairing and resource allocation of heterogeneous users for uplink virtual MIMO system over LTEA network. 2014 IEEE Wireless Communications and Networking Conference (WCNC). Istanbul, Turkey. Apr. 6-9, 2014. pp. 1903-1908.

Samardzija, Dragan et al. Coherent joint-processing CoMP in picocellular lamp-post street deployment. 2011 IEEE 12th Workshop on Signal Processing Advances in Wireless Communications (SPAWC 2011). San Francisco, USA. Jun. 26-29, 2011. pp. 496-500.

* cited by examiner

METHOD AND APPARATUS FOR IMPLEMENTING A COOPERATIVE MULTIPLE-INPUT-MULTIPLE-OUTPUT OPERATION

RELATED APPLICATION

This application was originally filed as PCT Application No. Jul. 19, 2016 filed Jul. 19, 2016 which claims priority benefit from US Application No. 62/204,843 filed Aug. 13, 2015.

BACKGROUND

Field

Embodiments of the present invention relate to implementing a cooperative Multiple-Input-Multiple-Output operation.

Description of the Related Art

Multiple-input and multiple-output (MIMO) may be considered to be a method for enhancing data communication by utilizing multipath propagation and spatial diversity. MIMO may multiply the capacity of a radio link using multiple transmitting and receiving antennas. MIMO may be used in conjunction with Long-term Evolution (LTE). LTE is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include determining, by a network node, that a triggering has occurred. The triggering corresponds to a triggering of a formation of a multiple-input and multiple-output arrangement. The multiple-input and multiple-output arrangement includes a grouping of user antennas and an antenna of the network node. The network node is located at an existing infrastructure. The method may also include receiving data traffic information, wherein the data traffic information comprises information that indicates an amount of data traffic that is requested by users of the user antennas. The method may also include forming the multiple-input and multiple-output arrangement based on the received data traffic information.

In the method of the first embodiment, the determining includes determining by a network node that comprises a control node at the existing infrastructure. The existing infrastructure includes at least one of a traffic light and a light post.

In the method of the first embodiment, the users of the user antennas correspond to users of vehicular antennas.

In the method of the first embodiment, the determining that the triggering has occurred may include determining at least one of: (1) a traffic light of the existing infrastructure has turned or is about to turn yellow or red, and (2) a vehicle traffic of the users is moving slowly.

In the method of the first embodiment, the method may also include receiving a waiting time information. The waiting time information indicates an amount of time that is spent by the users waiting at a traffic light or waiting in traffic, and the forming is based on the received waiting time information.

In the method of the first embodiment, the method may also include receiving a mobility prediction information. The mobility prediction information indicates an approximate time of arrival of the users to within a coverage area, and the forming is based on the received mobility prediction information.

According to a second embodiment, an apparatus may include at least one processor. The apparatus may also include at least one memory including computer program code. The at least one memory and the computer program code may be configured, with the at least one processor, to cause the apparatus at least to determine that a triggering has occurred. The triggering corresponds to a triggering of a formation of a multiple-input and multiple-output arrangement. The multiple-input and multiple-output arrangement includes a grouping of user antennas and an antenna of the apparatus. The apparatus is located at an existing infrastructure. The apparatus may also be caused to receive data traffic information. The data traffic information may include information that indicates an amount of data traffic that is requested by users of the user antennas. The apparatus may also be caused to form the multiple-input and multiple-output arrangement based on the received data traffic information.

In the apparatus of the second embodiment, the apparatus may include a control node at the existing infrastructure. The existing infrastructure may include at least one of a traffic light and a light post.

In the apparatus of the second embodiment, the users of the user antennas correspond to users of vehicular antennas.

In the apparatus of the second embodiment, the determining that the triggering has occurred may include determining at least one of: (1) a traffic light of the existing infrastructure has turned or is about to turn yellow or red, and (2) a vehicle traffic of the users is moving slowly.

In the apparatus of the second embodiment, the apparatus may be further caused to receive a waiting time information. The waiting time information indicates an amount of time that is spent by the users waiting at a traffic light or waiting in traffic, and the forming is based on the received waiting time information.

In the apparatus of the second embodiment, the apparatus may be further caused to receive a mobility prediction information. The mobility prediction information indicates an approximate time of arrival of the users to within a coverage area, and the forming is based on the received mobility prediction information.

According to a third embodiment, a computer program product may be embodied on a non-transitory computer readable medium. The computer program product may be configured to control a processor to perform a method including determining, by a network node, that a triggering has occurred. The triggering corresponds to a triggering of a formation of a multiple-input and multiple-output arrangement. The multiple-input and multiple-output arrangement may include a grouping of user antennas and an antenna of the network node. The network node is located at an existing infrastructure. The method may also include receiving data traffic information. The data traffic information may include information that indicates an amount of data traffic that is requested by users of the user antennas. The method may also include forming the multiple-input and multiple-output arrangement based on the received data traffic information.

In the computer program product of the third embodiment, the determining may include determining by a network node that comprises a control node at the existing infrastructure. The existing infrastructure may include at least one of a traffic light and a light post.

In the computer program product of the third embodiment, the users of the user antennas correspond to users of vehicular antennas.

In the computer program product of the third embodiment, the determining that the triggering has occurred may include determining at least one of (1) a traffic light of the existing infrastructure has turned or is about to turn yellow or red, and (2) a vehicle traffic of the users is moving slowly.

In the computer program product of the third embodiment, the method may include receiving a waiting time information. The waiting time information indicates an amount of time that is spent by the users waiting at a traffic light or waiting in traffic, and the forming is based on the received waiting time information.

In the computer program product of the third embodiment, the method may also include receiving a mobility prediction information. The mobility prediction information indicates an approximate time of arrival of the users to within a coverage area. The forming is based on the received mobility prediction information.

BRIEF DESCRIPTION OF THE DRAWINGS

For proper understanding of the invention, reference should be made to the accompanying drawings, wherein.

DETAILED DESCRIPTION

Certain embodiments of the present invention relate to implementing a cooperative Multiple-Input-Multiple-Output operation. One of the key features of 5G networks relates to the use of existing infrastructure for enabling an improved user experience and for delivering a higher capacity of data/communication. Cooperative MIMO formation enables multiple nodes to send data independently, possibly reusing the same physical resources, thereby enhancing the capacity of the network. One of the methods for enabling a higher capacity of data/communication may utilize an ultra-dense deployment of small cell nodes on top of lamp posts. Another method for enabling a higher capacity of data/communication may utilize a deployment of small cell nodes at other types of public locations.

Certain enhancements to data/communication may use traffic lights, where such traffic lights may already have a stable connection to electrical power. The traffic lights may also have possible links to infrastructure nodes (such as links to traffic management systems, for example). These types of traffic lights may warrant special attention in the course of developing 5G technology enablers. Existing infrastructure (other than traffic lights) that are also in the vicinity of the end users may also have access to electricity, and these other types of existing infrastructure may also be possible elements for providing wireless and/or fixed internet connectivity to the users.

Currently, there are studies in the field of 5G research and standardization that are directed to supporting seamless connectivity for users in mobility. The studies are also directed to various enablers of such seamless connectivity. The seamless connectivity is to occur while providing extreme mobile broadband data rates, as required by 5G networks.

An average commuter spends a significant amount of time waiting at traffic lights. For example, in the United States, each commuter spends, on average, around 38 hours per year waiting at traffic lights. The commuters may also spend a significant amount of time waiting in traffic jams or waiting within slow-moving traffic. With the advent of mobile communication technology, users may utilize this time (waiting at traffic lights) to browse the internet, or to use various other internet connectivity services.

Figure 1:
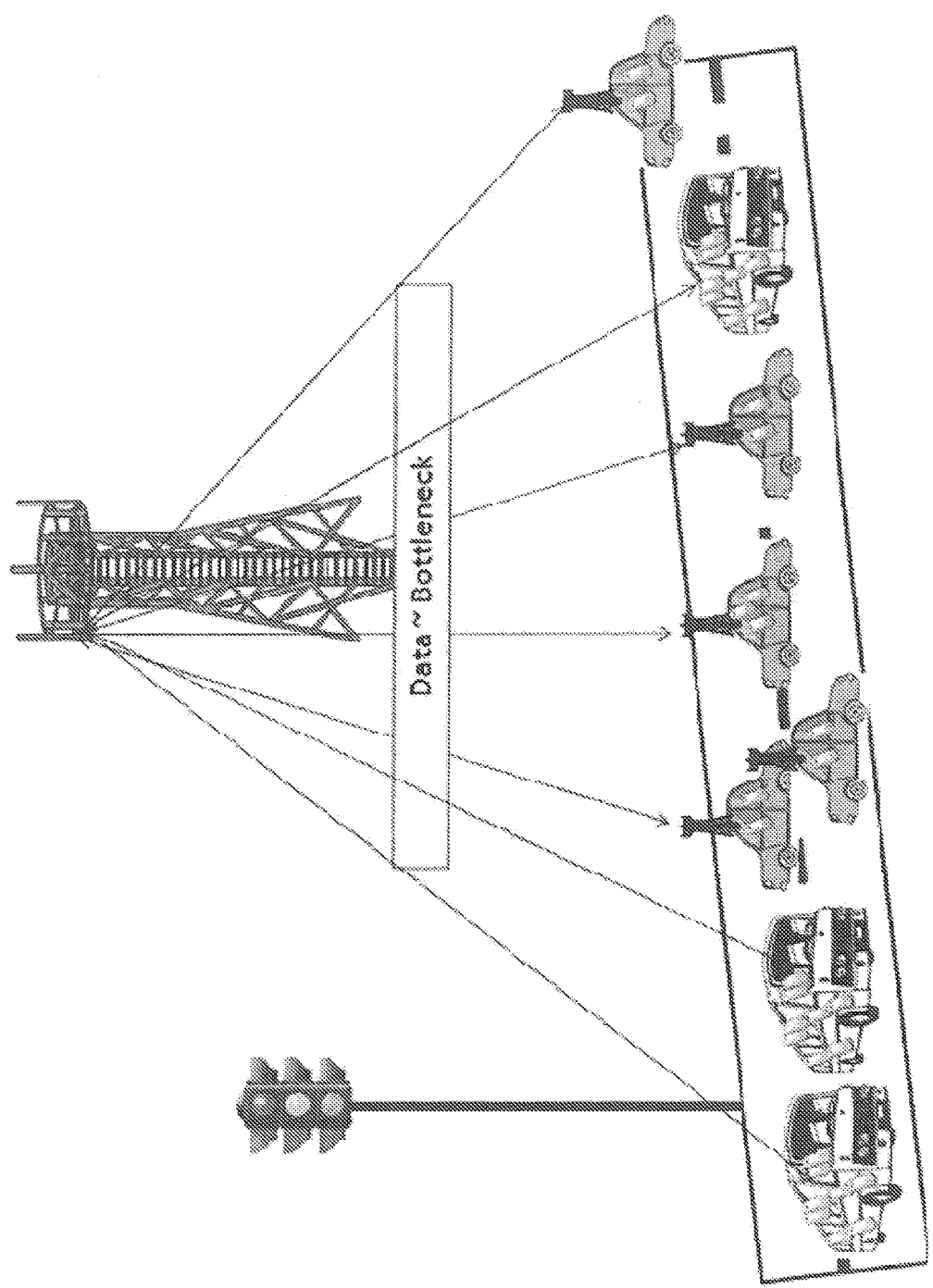
FIG. 1 illustrates an example physical region with a temporary bottleneck.

With 5G networks, the expected demand capacity is expected to be 1000 times greater than the current demand. At locations with a high density of users (where the users have gathered together due to, for example, the presence of traffic lights or traffic jams), the demanded capacity at these locations could be particularly high. Thus, the problems associated with satisfying the expected demand capacity may become more severe, thereby forming physical regions with temporal bottlenecks. FIG. 1 illustrates an example physical region with a temporary bottleneck.

The previous approaches for satisfying a demand for network traffic do not provide a clear solution for satisfying the demanded capacity at locations with a high density of users. As discussed above, in many instances where there are a high density of users, there will also be existing infrastructure and infrastructure nodes (such as, for example, a traffic light or a lamp post). The previous approaches do not consider how to integrate the infrastructures/infrastructure nodes with various other mobility services for enhancing user experience.

The shortcomings of the previous approaches become even more acute in view of the high mobile broadband rates that need to be supported for such users. Also, the shortcomings of the previous approaches may become even more acute because the users may be utilizing moving vehicular networks to provide connectivity within the vehicles, where such utilization of moving vehicular networks may result in severe interference situations. Severe interference may occur especially at traffic lights where a large multitude of such users assemble and communicate with the network.

In view of the above-described shortcomings, certain embodiments are directed to mechanisms that mitigate the effects of these shortcomings. Further, certain embodiments may mitigate the effects of the above-described shortcomings, without adding significant cost to the network operator. For example, because certain embodiments may utilize the existing infrastructure, certain embodiments may reduce the need to find new sites for deploying evolved Node Bs (eNBs) or antennas.

Certain embodiments of the present invention are directed to implementing a predictive cooperative Multiple Input Multiple Output arrangement. In contrast with the previous approaches, in addition to taking into consideration the aspects considered by the previous approaches, certain embodiments may also consider other aspects when implementing a MIMO arrangement. For example, certain embodiments of the present invention may consider aspects that enable optimization of power consumption by a receiver of a user, for example.

Certain embodiments of the present invention may configure interaction between different traffic and communication systems. For example, certain embodiments may enable interaction between, at least, a navigation system, a radio access system, and/or a vehicle traffic management system, as described in more detail below.

Certain embodiments provide enhanced connectivity and enhanced communication for the users by using infrastructure nodes in a more optimal manner. Connectivity and communication may be enhanced by providing improved data throughput for the users.

Certain embodiments of the present invention may provide an opportunistic MIMO setup in the proximity of traffic lights, or in the proximity of other infrastructure nodes.

In the course of providing the MIMO setup, certain embodiments of the present invention may group/combine antennas of the vehicles (of the users) together with antennas from a traffic light post. For example, the grouping/combining of the antennas may be triggered when a traffic light turns yellow or red, or when the user vehicles are moving very slowly due to a traffic jam or for some other reasons. Specifically, a traffic management system may use an impending yellow/red light to trigger an initiation of a virtual MIMO formation by a radio access system. Virtual MIMO techniques essentially make use of the spatial diversity between different mobile terminals to form MIMO, possibly using multiple single antennas from the spatially distributed terminals. Thus, from the end user perspective, the virtual MIMO configuration formed between the various moving nodes and antennas in traffic lights would seem like an actual MIMO transmitter.

With certain embodiments, a navigation system may provide mobility prediction information regarding an approximate time of arrival of various users at a particular traffic light. With certain embodiments, the navigation system may also provide predications regarding an approximate time of arrival of various users at a particular point in a traffic jam. This mobility prediction information may be utilized by certain embodiments in the formation of the MIMO setup. By using the mobility prediction information, certain embodiments will be able to determine which vehicle antennas may be included in the MIMO setup at a specific time/place. With certain embodiments, a traffic light post may act as a control node for forming a virtual MIMO configuration.

A Radio Access System may provide information relating to the data traffic that is needed/requested by the users that are connected to their vehicular antennas. A user may need/request a certain amount of data traffic if the user is downloading a High-definition/Ultra-HD movie, for example.

Based on the information relating to the data traffic that is requested/needed by the users, a control node (such as a traffic light node, for example) may determine an optimized virtual MIMO formation arrangement that is able to best serve the users.

The traffic light node may use advanced sensors to determine a traffic density at a corresponding traffic light. With certain embodiments, the traffic light node may also consider an average vehicular speed as a parameter for making the decisions relating to determining the virtual MIMO formation arrangement.

With certain embodiments, the Radio Access System may aggregate both information from navigation systems and information from traffic management systems. The information is aggregated to provide a MIMO access system at, for example, a red light. The provided MIMO access system may provide additional transmit antennas to enhance the user experience for the users that are waiting for the green light. The MIMO arrangement may be triggered by the control node, which is possibly located at the traffic lights. The Radio access system may provide the configuration details, with all the information available in it, such as user traffic, for example.

Certain embodiments may utilize traffic-light infrastructure, and other embodiments may utilize infrastructure that is different than traffic lights. The formed MIMO arrangement can be used for the optimal delivery of data traffic to the infrastructure node at the traffic lights as well.

With certain embodiments, an individual vehicle may take the initiative and propose cooperation between antennas. Then, the network could support the vehicle based on predictions on potential traffic and routes of other vehicles. With other embodiments, the network may take the initiative and perform management of the MIMO formation.

As described above, a slow speed of relevant vehicles may be a triggering event for MIMO formation. With such a slow speed, the vehicles would generally be near each other for a longer time and thus could support each other.

After the MIMO formation is no longer needed, the radio access system can also effectively disable the MIMO mechanisms at the appropriate time. Certain embodiments may determine whether the MIMO formation is no longer needed based upon information received from the traffic management system. The received information may relate to an amount of time that is spent by users waiting at a traffic light or waiting in traffic, for example.

Figure 2:
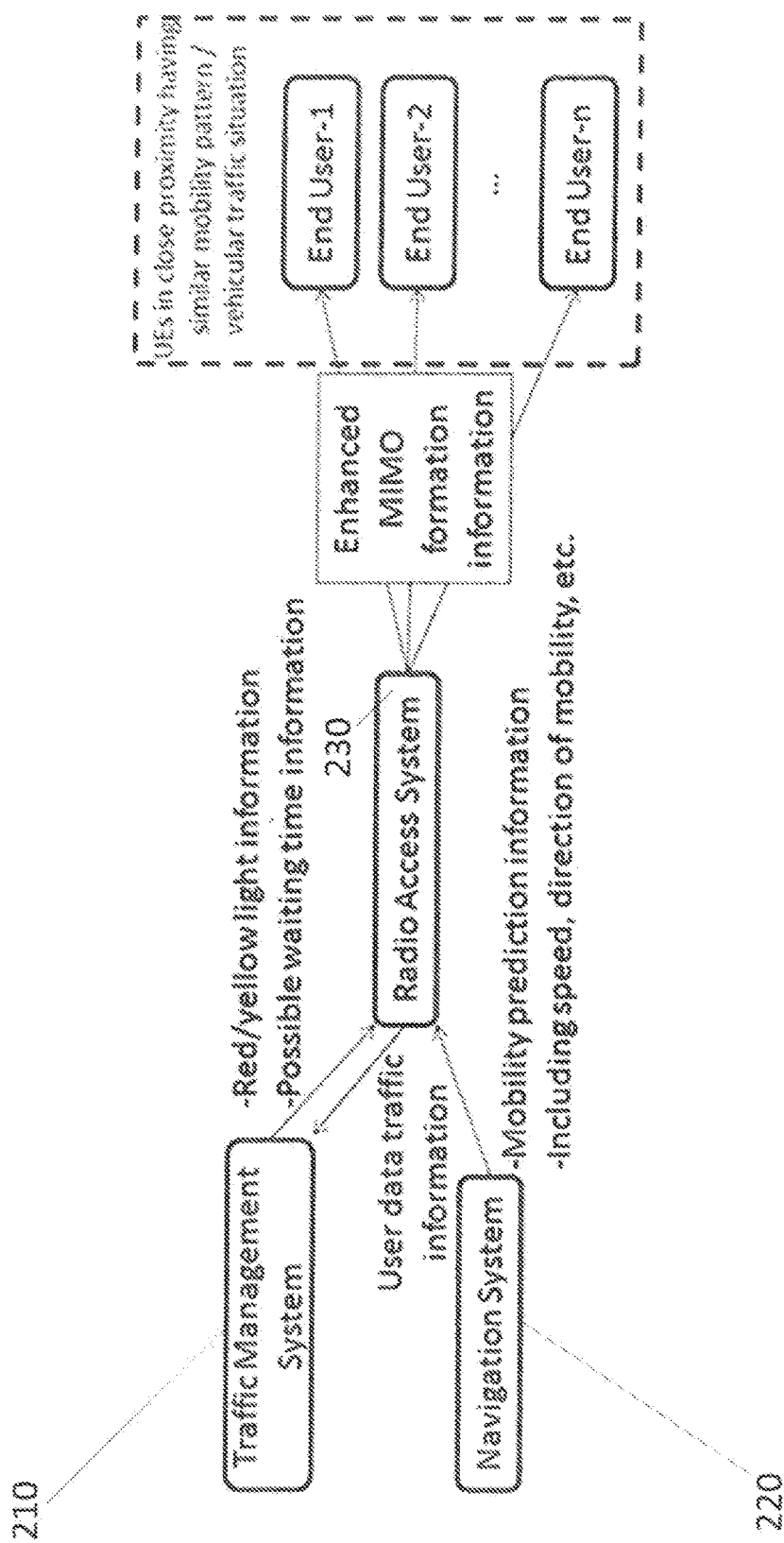
FIG. 2 illustrates an overview diagram of a mechanism in accordance with certain embodiments of the present invention.

FIG. 2 illustrates an overview diagram of a mechanism in accordance with certain embodiments of the present invention. Referring to FIG. 2, the Traffic Management System 210, Navigation System 220, and the Radio Access System 230 interact with each other in order to enable a virtual MIMO formation. With the virtual MIMO formation, all of the antennas in the proximity of the traffic light may cooperate with each other.

With regard to the role of Traffic Management System 210, the Traffic Management System 210 may provide certain road traffic information. For example, the Traffic Management System 210 may provide information relating to a road traffic pattern of relevant automobiles. For example, the Traffic Management System 210 may provide information relating to red/yellow light information and/or possible waiting times. The traffic management system may provide the information to the radio access system, in order to assist in the efficient virtual MIMO formation in the proximity of the traffic lights.

The Traffic Management System 210 may also provide assistance information such as information relating to the density of the road traffic. As such, when there are instances of heavy traffic, the Radio Access System 230 can more effectively determine the duration for which the virtual MIMO formation is established. For example, the duration of the virtual MIMO formation may be longer if the traffic is moving slowly, and the duration may be independent of the state of the traffic light. The Traffic Management System 210 may also provide information relating to an availability of antennas in relation to the traffic lights or street side lampposts, to the radio access systems, as one of the inputs for forming the virtual MIMO. This information could be a part of the signalling sent for indicating the traffic light status, or as a part of the traffic density information.

With regard to the role of the Navigation System 220, the Navigation System 220 may provide valuable assistance information to the Radio Access System 230. The assistance information may include the direction of each car, the average speed of the cars, the final destination of each car, and/or the driving pattern of each car. The driving pattern of cars may relate to usual driving speeds at various speed limits and/or the pattern followed while stopping at a red light, for example. The radio access system may uses this assistance information as assistance information for the decision-making process in the virtual MIMO formation.

Optionally, in 5G systems, the Navigation System 220 may be integrated with a vehicle's cellular network interface, thereby providing all of the relevant information directly to the cellular network. The relevant information may also be provided to the cellular network based on information requests from the Radio Access System 230.

With regard to the role of the Radio Access System 230, the Radio Access System 230 may receive assistance information from the Traffic Management System 210 and the Navigation System 220. The Radio Access System 230 may decide the formation of virtual MIMO at the vicinities of the traffic light. The traffic light antenna may play the role of a control node, in configuring the virtual MIMO. Based on the information with respect to an impending yellow/red light, the traffic light antenna may receive the traffic information from the various vehicular users, and the traffic light antenna may form a virtual MIMO, by coordinating all the vehicular antennas in its vicinity.

Figure 3:
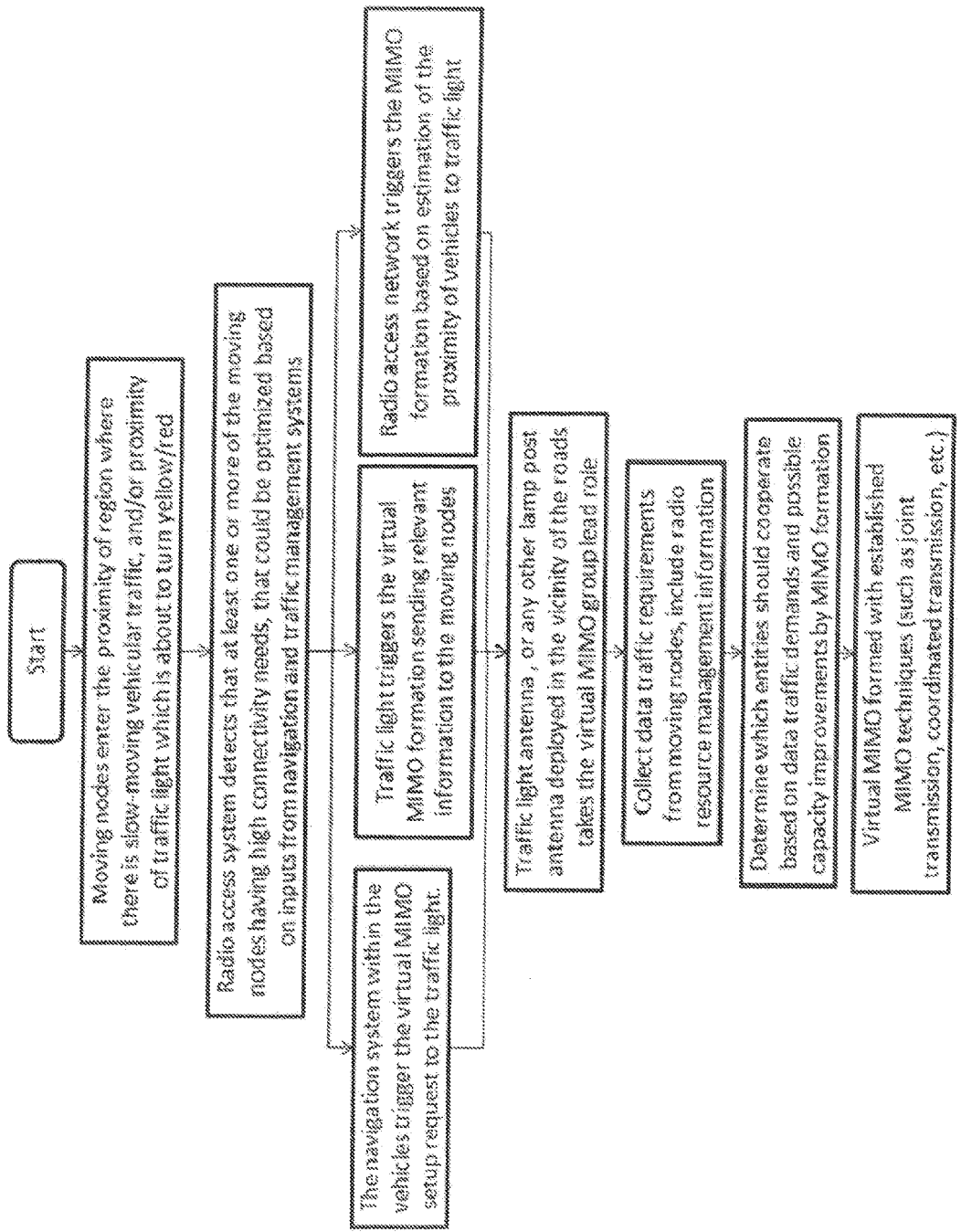
FIG. 3 illustrates a flow diagram of a method in accordance with certain embodiments of the present invention.

FIG. 3 illustrates a flow diagram of a method in accordance with certain embodiments of the present invention. The triggering mechanism may be the entrance of moving nodes into the proximity of road-side antennas (that may be deployed on traffic lights or lamp posts), when there is slow or uniform moving traffic, and/or when there are yellow/red lights at the traffic intersection. Once the radio access system detects that one or more of the moving nodes has high connectivity needs that could be optimized by coordinated operation of the antennas in the vicinity of this region, certain embodiments may initiate the MIMO formation.

Here, the radio access system may determine the need for setting up a virtual MIMO. The radio access system may determine the need by calculating channel conditions between the potentially coordinating moving nodes, and the radio access system may estimate a potential gain in a capacity that can be achieved by cooperation.

The setup procedure may utilize assistance information from the traffic system or from the navigation system as well. Once the operation is triggered, either the roadside infrastructure node (such as a lamp post or traffic light antenna, for example) could take up a group leader role (i.e., act as a control node), or may configure the group leader within the cooperating moving nodes as well. Based on the collected data traffic demand information, and based on other assisting information, the cooperating nodes can be identified as well. Here, the cooperating nodes could be determined based on various business models as well. For example, gold users' traffic demand may be considered by the Radio Access System to have higher priority, and cooperating nodes which are configured to satisfy this demand could be given beneficial offers in terms of subscription rates, for example. With one embodiment, the virtual MIMO system can be just based on the available antennas at a vehicle and the traffic light or lamp post.

After these operations are completed, the virtual MIMO is setup. The virtual MIMO may be set up based on an already existing technology, such as a join transmission, or a coordinated scheduling, for example. The trigger to end such a cooperation could be, when the radio access system receives information that the traffic light status is changing, or when the traffic density conditions are going to change. When such information is received, the virtual MIMO setup is removed, and a regular communication mode is established.

Figure 4:
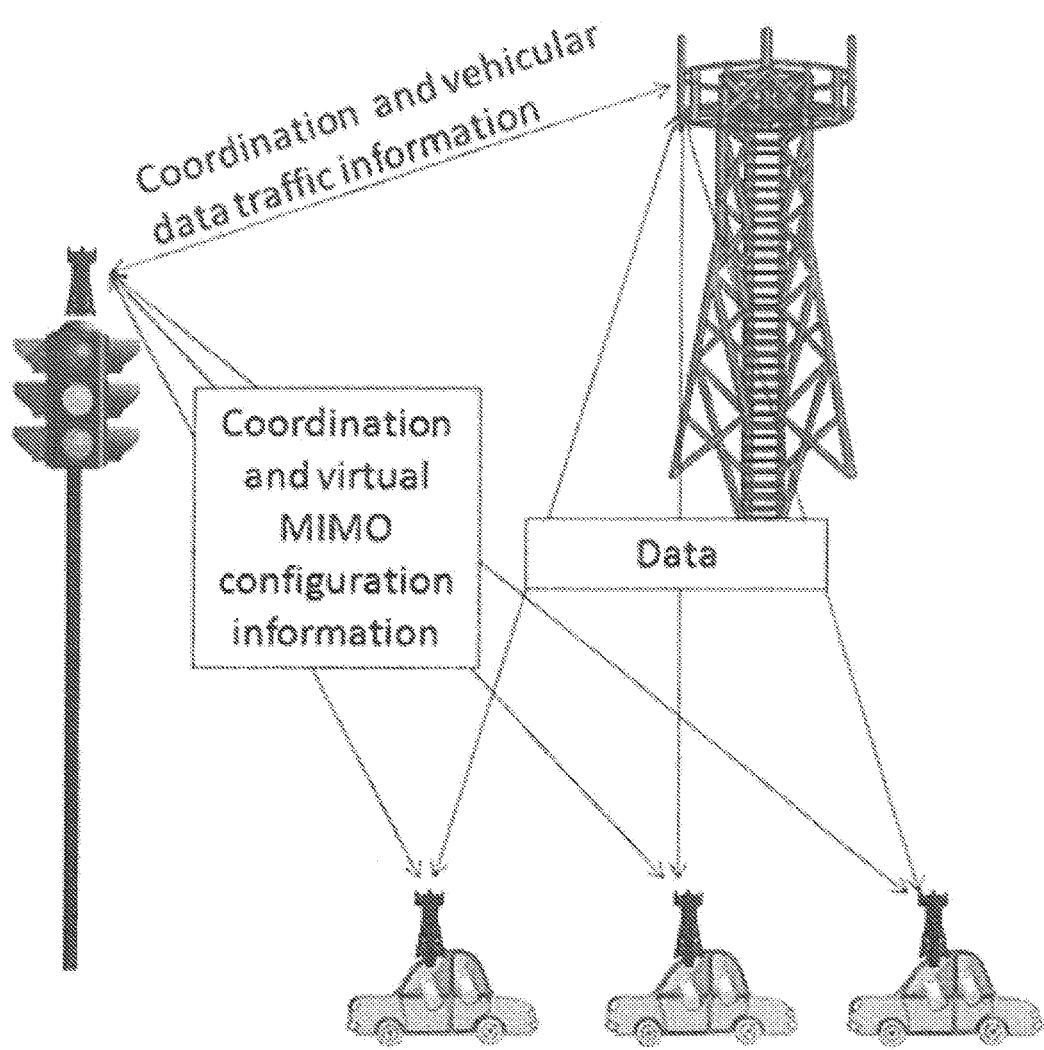
FIG. 4 illustrates a possible operation diagram in accordance with certain embodiments of the present invention.

FIG. 4 illustrates a possible operation diagram in accordance with certain embodiments of the present invention. Here, the antenna at the traffic light may provide the virtual MIMO formation-related coordination information, and the antenna may, optionally, transmit data as well. As described above, the antenna at the traffic light may be an infrastructure node that performs as a control/group-leader node. The control information for the node in the traffic light comes from the eNB that provides coverage for all the vehicular antennas/cells. The virtual MIMO control information could also include signalling for the vehicular antennas to stop coordination, or timers regarding the upcoming change in traffic light, for example.

In view of the above, a control node, such as a node at the traffic light antenna, can make coordinated decisions based on the received control information from the coverage layer, based on the received information relating to the vehicular data traffic pattern, and/or based on interference information. In order to improve performance reliability, dedicated frequencies may be used to establish the link between a traffic light and vehicular antennas. The traffic light antenna may essentially act as a master node in a virtual MIMO setting, with the link between the traffic light antenna and the vehicular antenna providing a high-capacity backhaul link for providing interference mitigation, and capacity enhancements using MIMO.

With certain embodiments, depending on the network conditions and the configurations used, the capacity can be increased by a factor of n, where n is the number of cooperating nodes. As such, certain embodiments may provide better user experience for end users.

Figure 5:
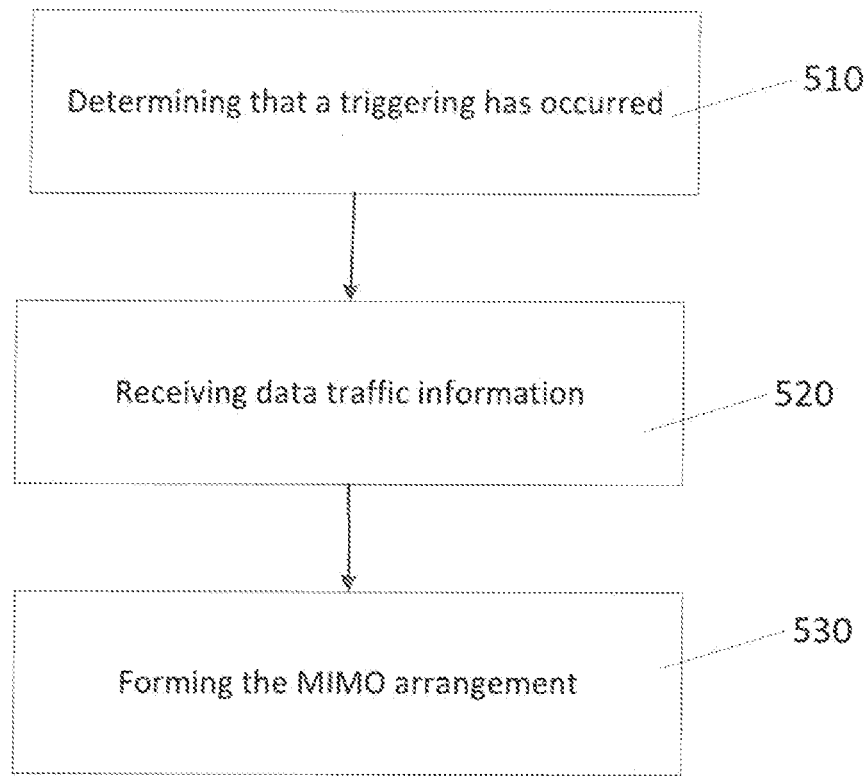
FIG. 5 illustrates a flowchart of a method in accordance with certain embodiments of the invention.

FIG. 5 illustrates a flowchart of a method in accordance with certain embodiments of the invention. The method illustrated in FIG. 5 includes, at 510, determining, by a network node, that a triggering has occurred. The triggering corresponds to a triggering of a formation of a multiple-input and multiple-output arrangement. The multiple-input and multiple-output arrangement comprises a grouping of user antennas and an antenna of the first network node, and the network node is located at an existing infrastructure. The method also includes, at 520, receiving data traffic information. The data traffic information comprises information that indicates an amount of data traffic that is requested by users of the user antennas. The method also includes, at 530, forming the multiple-input and multiple-output arrangement based on the received data traffic information.

Figure 6:
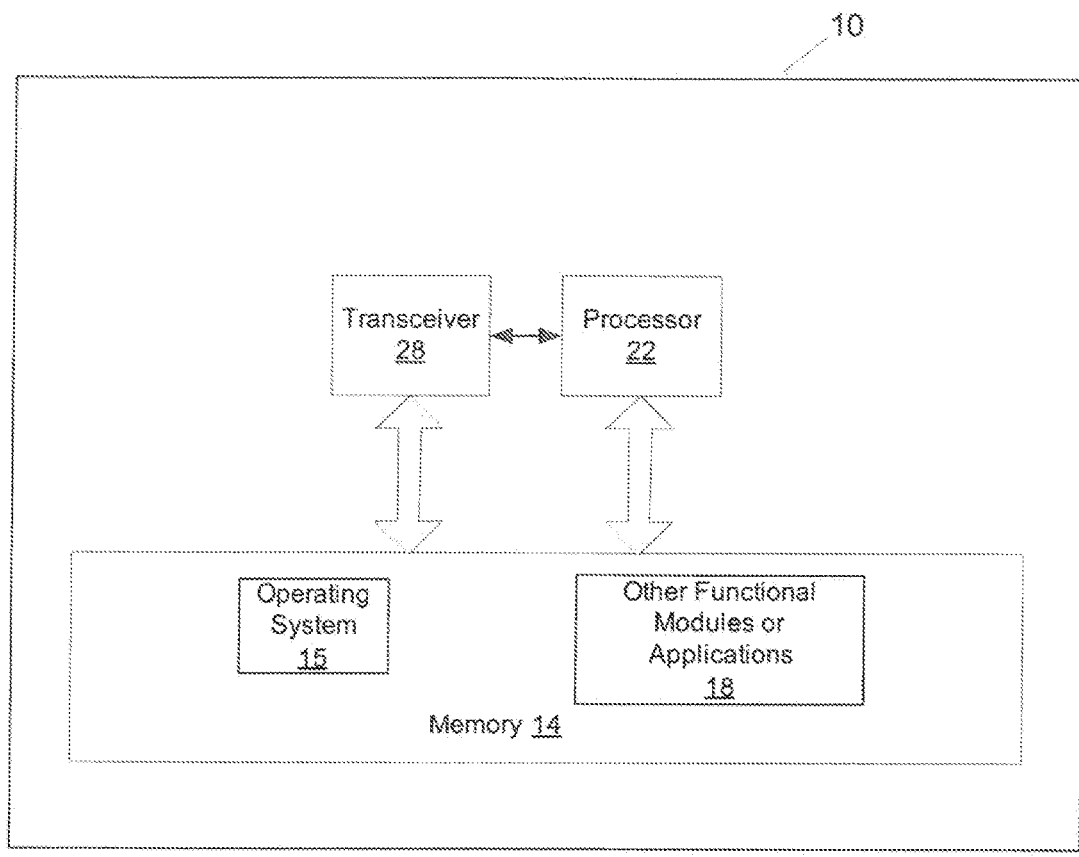
FIG. 6 illustrates an apparatus in accordance with certain embodiments of the invention.

FIG. 6 illustrates an apparatus in accordance with certain embodiments of the invention. In one embodiment, the apparatus can be a network node configured to perform the functions of a control node, for example. In certain embodiments, the network node may be located at an existing infrastructure. Apparatus 10 can include a processor 22 for processing information and executing instructions or operations. Processor 22 can be any type of general or specific purpose processor. While a single processor 22 is shown in FIG. 6, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 7:
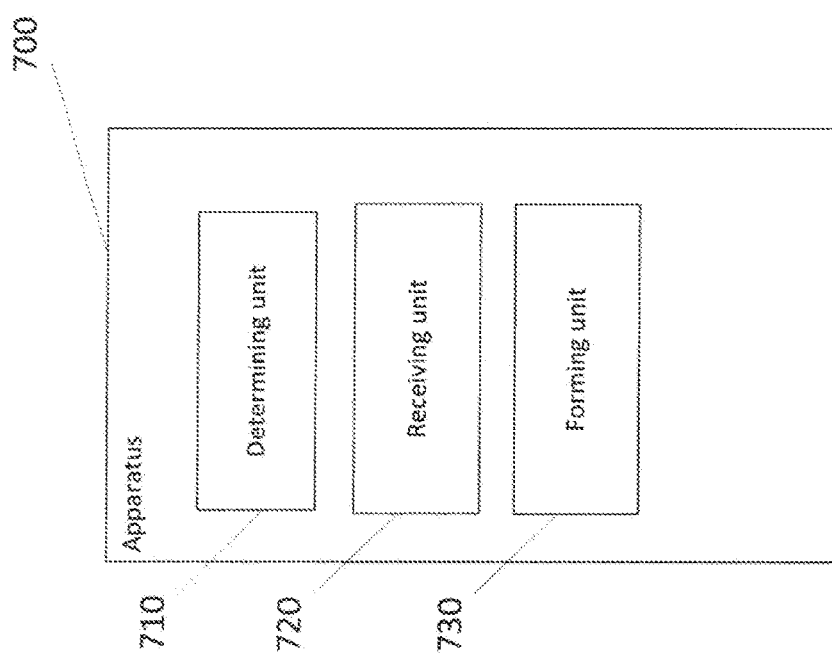
FIG. 7 illustrates an apparatus in accordance with certain embodiments of the invention.

FIG. 7 illustrates an apparatus in accordance with certain embodiments of the invention. Apparatus 700 can be a network element/entity such as a network node that is configured to perform as a control node, for example. Apparatus 700 can include a determining unit 710 that determines that a triggering has occurred. The triggering corresponds to a triggering of a formation of a multiple-input and multiple-output arrangement. The multiple-input and multiple-output arrangement comprises a grouping of user antennas and an antenna of the first network node. The network node is located at an existing infrastructure. Apparatus 700 can also include a receiving unit 720 that receives data traffic information. The data traffic information comprises information that indicates an amount of data traffic that is requested by users of the user antennas. Apparatus 700 also includes a forming unit 730 that forms the multiple-input and multiple-output arrangement based on the received data traffic information.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining, by a network node, that a triggering has occurred, wherein the triggering corresponds to a triggering of a formation of a multiple-input and multiple-output arrangement, the multiple-input and multiple-output arrangement comprises a grouping of user antennas and an antenna of the network node, and the network node is located at an existing infrastructure;
   receiving data traffic information, wherein the data traffic information comprises information that indicates an amount of data traffic that is requested by users of the user antennas, and mobility prediction information, wherein the mobility prediction information indicates an approximate time of arrival of the users to within a coverage area; and
   forming the multiple-input and multiple-output arrangement based on the received data traffic information and mobility prediction information.

2. The method according to claim 1, wherein the determining comprises determining by a network node that comprises a control node at the existing infrastructure, and the existing infrastructure comprises at least one of a traffic light and a light post.

3. The method according to claim 1, wherein the users of the user antennas correspond to users of vehicular antennas.

4. The method according to claim 1, wherein the determining that the triggering has occurred comprises determining at least one of: (1) a traffic light of the existing infrastructure has turned or is about to turn yellow or red, and (2) a vehicle traffic of the users is moving slowly.

5. The method according to claim 1, further comprising receiving a waiting time information, wherein the waiting time information indicates an amount of time that is spent by the users waiting at a traffic light or waiting in traffic, and the forming is based on the received waiting time information.

6. An apparatus, comprising:
   at least one processor; and
   at least one memory including computer program code,
   the at least one memory and the computer program code configured, with the at least one processor, to cause the apparatus at least to
   determine that a triggering has occurred, wherein the triggering corresponds to a triggering of a formation of a multiple-input and multiple-output arrangement, the multiple-input and multiple-output arrangement comprises a grouping of user antennas and an antenna of the apparatus, and the apparatus is located at an existing infrastructure;
   receive data traffic information, wherein the data traffic information comprises information that indicates an amount of data traffic that is requested by users of the user antennas, and mobility prediction information, wherein the mobility prediction information indicates an approximate time of arrival of the users to within a coverage area; and form the multiple-input and multiple-output arrangement based on the received data traffic information and mobility prediction information.

7. The apparatus according to claim 6, wherein the apparatus comprises a control node at the existing infrastructure, and the existing infrastructure comprises at least one of a traffic light and a light post.

8. The apparatus according to claim 6, wherein the users of the user antennas correspond to users of vehicular antennas.

9. The apparatus according to claim 6, wherein the determining that the triggering has occurred comprises determining at least one of: (1) a traffic light of the existing infrastructure has turned or is about to turn yellow or red, and (2) a vehicle traffic of the users is moving slowly.

10. The apparatus according to claim 6, wherein the apparatus is further caused to receive a waiting time information, wherein the waiting time information indicates an amount of time that is spent by the users waiting at a traffic light or waiting in traffic, and the forming is based on the received waiting time information.

11. A computer program product, embodied on a non-transitory computer readable medium, the computer program product configured to control a processor to perform a method comprising:

determining, by a network node, that a triggering has occurred, wherein the triggering corresponds to a triggering of a formation of a multiple-input and multiple-output arrangement, the multiple-input and multiple-output arrangement comprises a grouping of user antennas and an antenna of the network node, and the network node is located at an existing infrastructure;

receiving data traffic information, wherein the data traffic information comprises information that indicates an amount of data traffic that is requested by users of the user antennas, and mobility prediction information, wherein the mobility prediction information indicates an approximate time of arrival of the users to within a coverage area; and forming the multiple-input and multiple-output arrangement based on the received data traffic information and mobility prediction information.

12. The computer program product according to claim 11, wherein the determining comprises determining by a network node that comprises a control node at the existing infrastructure, and the existing infrastructure comprises at least one of a traffic light and a light post.

13. The computer program product according to claim 11, wherein the users of the user antennas correspond to users of vehicular antennas.

14. The computer program product according to claim 11, wherein the determining that the triggering has occurred comprises determining at least one of: (1) a traffic light of the existing infrastructure has turned or is about to turn yellow or red, and (2) a vehicle traffic of the users is moving slowly.

15. The computer program product according to claim 11, wherein the method further comprises receiving a waiting time information, wherein the waiting time information indicates an amount of time that is spent by the users waiting at a traffic light or waiting in traffic, and the forming is based on the received waiting time information.

* * * * *